ÙUnited States Patent Office 3,354,113
Patented Nov. 21, 1967

3,354,113
COLOR IMPROVEMENT OF ACRYLIC SPIN DOPES
Dudley W. Cheape, Jr., and Julian J. Hirshfeld, Decatur, Ala., assignors to Monsanto Company, St. Louis, Mo., a corporation of Delaware
No Drawing. Filed Oct. 2, 1964, Ser. No. 401,230
4 Claims. (Cl. 260—32.6)

ABSTRACT OF THE DISCLOSURE

This invention relates to color stabilized solutions of polyacrylonitrile polymers and copolymers having good whiteness characteristics after having been subjected to relatively high temperatures, the solutions obtained by incorporating in the acrylic polymer dope solution an active metal and a strong acid which, in situ with the solution, generate hydrogen. The preferred metals being zinc and aluminum and the preferred acids are hydrochloric and phosphoric.

---

This invention relates to color stabilized solutions of polyacrylonitrile polymers and copolymers, and more particularly, to polyacrylonitrile polymers and copolymers having good whiteness after being subjected to relatively high temperatures.

Acrylic polymers composed of entirely acrylonitrile or copolymers or interpolymers composed of acrylonitrile and one or more other vinyl monomers, such as, vinyl acetate, methylacrylate, vinylidene chloride, vinyl chloride and styrene, can be dissolved in organic solvents such as dimethylformaldehyde or dimethylacetamide to form viscous solutions commonly referred to as dope. To form filaments from the dope, it is extruded through many small shaped orifices into an aqueous or other bath which is compatible with the organic polymer solvent but is not solvent for the polymer, whereupon the polymer is coagulated by the solvent being dissipated in the aqueous bath. The coagulated polymer which is then in the form of filaments, after being washed, stretched and dried, may be cut into staple or used as continuous filament tows to produce a wide variety of textile goods.

For most textile processes, it is desirable that the synthetic fibers be of a good white color. This requirement is obvious where the finished goods are to be white, however, it is also very desirable where the product is to be dyed and especially for pastel shades in order that the true claimed colors may be produced. The spinning solutions of the polymer and the organic solvent are typically very heat sensitive, and rapidly change from a water white color to a yellow or even brown color as they are held at elevated temperatures for a period of time. This change in dope color is significantly reflected in the color of the fibers spun therefrom, and represent a serious problem since a fiber of poor whiteness cannot be sold as first grade material for many applications.

To dissolve the polymer in organic solvent within a reasonable period of time, temperatures of at least 50° C. are required and, more usefully the temperature ranges from 70 to 85° C. Without these high temperatures, the polymer dissolves in the solvent very slowly and at low temperatures not at all. Since all of the dope made cannot be spun at the time at which it was prepared, it is common to hold the dope for periods of 30 minutes to 4 hours before spinning. The result of sustaining the dope at elevated temperatures is the formation of a chromophore which varies considerably as a function of time and temperature. It is to the reduction of the formation of the chromophores that the attention of this application is directed. Many examples of stabilizing compounds which may be added to the polymer solution to inhibit the color formation are cited in the literature but none of these have found commercial acceptance either because of poor economics or because of their adverse affects on either the dope or the fiber properties, such as, dope spinnability, fiber strength or dyeability.

An object of this invention is to provide a method for inhibiting the formation of chromophores in a polymer dope which is held at relatively high temperatures for extended periods of time.

A further object of this invention is to provide an economical method of stabilizing polymer solutions.

Another object of this invention is to provide a dope color stabilizer which will allow the production of synthetic fibers of good whiteness and which will not adversely effect the other fiber properties.

A still further object of this invention is to provide a polymeric dope with a reducing agent which inhibits the formation of color in the polymer solutions.

Other objects and advantages of this invention will be more apparent to those skilled in the art from the following more detailed description which illustrates and discloses but is not intended to limit the scope of this invention.

Generally, the objects of this invention are accomplished by the in situ generation of nascent hydrogen in the acrylic polymer dope solution by adding an active metal and a strong acid thereto. The preferred metals are zinc and aluminum and the preferred acids are hydrochloric and phosphoric. It should be noted that the use of phosphates themselves tend to bleach the dope to a small degree.

The polymeric materials, which may be employed in the practice of the present invention, are polyacrylonitrile copolymers, including binary and ternary polymers containing at least 80 percent by weight of acrylonitrile in the polymer molecule, or a blend comprising polyacrylonitrile or copolymers comprising acrylonitrile with from 2 to 50 percent of another polymeric material, the blend having an overall polymerized acrylonitrile content of at least 80 percent by weight. While the preferred polymers employed in the instant invention are those containing at least 80 percent of acrylonitrile, generally recognized as the fiber-forming acrylonitrile polymers it will be understood that the invention is likewise applicable to polymers containing less than 80 percent acrylonitrile and the same stability is realized, with the inhibiting agents defined herein. The acrylonitrile polymers containing less than 80 percent acrylonitrile are useful in forming films, coating compositions, molding operations, lacquers, etc., in all of which applications the alleviation of undesirable color is extremely important.

For example, the polymer may be a copolymer of from 80 to 98 percent acrylonitrile and from 2 to 20 percent of another monomer containing the >C=C< linkage and copolymerizable with acrylonitrile. Suitable mono-olefinic monomers include acrylic, alpha-chloroacrylic and methacrylic acids; the acrylates, such as methylmethacrylate, ethylmethacrylate, butylmethacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1 - chloro - 1 - bromo - ethylene; methacrylonitrile; acrylamide and methacrylamide; alpha-chloroacrylamide; or monoalkyl substitution products thereof; methylvinyl ketone; vinyl carboxylates, such as vinyl acetate, vinyl chloroacetate, vinyl propionate, and vinyl stearate; N - vinylidimides, such as N - vinylphthalimide and N-vinylsuccinimide; methylene malonic esters; itaconic acid and itaconic ester; N - vinylcarbazole; vinyl furane; alkyl vinyl esters; vinyl sulfonic acid; ethylene alpha, beta-dicarboxylic acids or their anhydrides or derivatives, such as diethylcitraconate, diethylmesaconate, styrene, vinyl naphthalene; vinyl - substituted tertiary heterocyclic amines, such as the vinylpyridines and alkyl - substituted vinyl-pyridines, for example, 2-vinylpyridine, 4-vinylpyridine, 2 - methyl - 5 - vinyl - pyridine, etc.; 1 - vinylimidazole and alkyl - substituted 1 - vinylimidazoles, such as 2 -, 4 -, or 5 - methyl - 1 - vinylimidazole, and other $>C=C<$ containing polymerizable materials.

The polymer may be a ternary interpolymer, for example, products obtained by the interpolymerization of acrylonitrile and two or more of any of the monomers, other than acrylonitrile, enumerated above. More specifically, and preferably, the ternary polymer comprises acrylonitrile, methacrylonitrile, and 2-vinylpyridine. The ternary polymers preferably contain from 80 to 97 percent of acrylonitrile, from 1 to 10 percent of a vinylpyridine or a 1 - vinylimidazole, and from 1 to 18 percent of another substance, such as methacrylonitrile or vinyl chloride.

The polymer may also be a blend of polyacrylonitrile or of a binary interpolymer of from 80 to 99 percent acrylonitrile and from 1 to 20 percent of at least one other $>C=C<$ containing substance with from 2 to 50 percent of the weight of the blend of a copolymer of from 10 to 70 percent of acrylonitrile and from 30 to 90 percent of at least one other $>C=C<$ containing polymerizable monomer. Preferably, when the polymeric material comprises a blend, it will be a blend of a copolymer of 90 to 98 percent acrylonitrile and from 2 to 10 percent of another mono - olefinic monomer, such as vinyl acetate, which is not receptive to dyestuff, with a sufficient amount of a copolymer of from 10 to 70 percent of acrylonitrile and from 30 to 90 percent of a vinyl-substituted tertiary heterocyclic amine, such as vinylpyridine or 1-vinylimidazole, to give a dyeable blend having an overall vinyl-substituted tertiary heterocyclic amine content of from 2 to 10 percent, based on the weight of the blend.

The polymers, useful in the practice of the present invention, may be prepared by any conventional polymerization procedures, such as mass polymerization methods, solution polymerization methods, or aqueous emulsion procedures. The preferred practice utilizes emulsion polymerization wherein the polymer is prepared in finely divided form for immediate use in the fiber fabrication operations. The preferred emulsion polymerization may ulitize batch procedures, wherein monomers are charged with an aqueous medium containing the necessary catalyst and dispersing agents. A more desirable method involves the continuous procedure in which the polymerization reactor is simultaneously and continuously supplied with monomers and aqueous solutions of the catalyst and activator, and the polymer is continuously withdrawn.

The polymerization is catalyzed by means of any water-soluble peroxy compound, for example the potassium, ammonium and other water-soluble salts of peroxy acids, sodium peroxide, hydrogen peroxide, sodium perborate, the sodium salts of other peroxy acids, and any other water-soluble compound containing a peroxy group (—O—O—). A wide variation in the quantity of peroxy compound is possible. For example, from 0.1 to 3.0 percent by weight of the polymerizable monomer may be used. The catalyst may be charged at the outset of the reaction, or it may be added continuously or in increments throughout the reaction for the purpose of maintaining a more uniform concentration of a catalyst in the reaction mass. The latter method is preferred because it tends to make the resultant polymer more uniform in its chemical and physical properties.

Although the uniform distribution of the reactants throughout the reaction mass can be achieved by vigorous agitation, it is generally desirable to promote the uniform distribution of reagents by using inert wetting agents, or emulsion stabilizers. Suitable reagents for this purpose are the water-soluble salts of fatty acids, such as sodium oleate and potassium stearate, mixtures of water-soluble fatty acid salts, such as common soaps prepared by the saponification of animal and vegetable oils, the "amino soaps," such as salts of diethanolamine and dodecylmethylamine, salts of rosin acids and mixtures thereof, the water-soluble salts of half esters of sulfuric acid and long chain aliphatic alcohols, sulfonated hydrocarbons, such alkyl aryl sulfonates, and any other of a wide variety of wetting agents, which are in general organic compounds containing both hydrophobic and hydrophilic radicals. The quantity of emulsifying agents will depend upon the particular agents selected, the ratio of monomer to be used, and the conditions of polymerization. In general, however, from 0.01 to 1.0 percent by weight of the monomers may be employed.

The emulsion polymerizations are preferably conducted in glass or glass-lined vessels which are provided with a means for agitating the contents. Generally, rotary stirring devices are the most effective means of insuring the intimate contact of the reagents, but other methods may be successfully employed, for example by rocking or tumbling the reactors. The polymerization equipment generally used is conventional in the art and the adaptation of a particular type of apparatus to the reaction contemplated is within the province of one skilled in the art. The articles manufactured therefrom may be produced by well-known conventional methods, for example, the wet spinning, dry spinning and melt spinning methods for producing fibers.

This invention is practiced by adding a small amount of hydrochloric acid or phosphoric acid or some other acid having similar characteristics and zinc or aluminum or some other metal having like characteristics to the solvent. For example, from about 0.5% to about 10% of hydrochloric acid or from about 1% to about 3.0% of phosphoric acid and from about 1% to about 2% of zinc can be added to the solvent to give good results, the percents based on weight of polymer to be added to the solvent. This mixture is then to be agitated for a few minutes to allow a partial reaction of the metal and the acid, the metal reacting with the acid to give a salt and hydrogen gas. The polymer is then added to the solvent and is dissolved thereby after the mixture is heated and agitated. The result is a viscous spinning solution. The acid and the metal continue to react and generate nascent hydrogen which effectively inhibits the formation of color bodies in the spinning solution while it is held at the elevated temperature.

The amounts of metal and acid added to the solvent are preferably controlled so that the reaction between them is essentially complete before the dope is spun into fiber. Any unreacted metal is removed from the dope during the normal filtration steps and any small amounts of unreacted acid are easily washed from the fiber. The salt which is formed from the acid and the metal is also easily removed by the same filtration and washing steps.

The following examples are cited to illustrate the invention and are not intended to limit it in any way. Unless otherwise specified, all "parts" are expressed as parts by weight.

*Example I*

Powdered zinc and hydrochloric acid were evaluated at various concentration levels as stabilizers for a spinning solution comprised of a copolymer of 93 percent AN and 7 percent VA dissolved in dimethylacetamide solvent. The zinc and acid were added to a 400 ml. sample of the solvent which was then chilled to 5° C. Sixty grams of the polymer were slurried in the solvent by vigorous agitation. The mixture was then heated to 100° C., and the color of the resulting dope subjectively evaluated. The effectiveness of the zinc-hydrochloric acid combination in inhibiting color development in the dope is illustrated by the data in Table I.

TABLE I

| Sample | Powdered Zinc | | 38% HCl Acid | | Subjective Color Evaluation |
|---|---|---|---|---|---|
| | Gm. | Percent BOP | Ml. | Percent BOP* | |
| A | 0 | 0 | 0 | 0 | Control—very yellow. |
| B | 0.8 | 1.3 | 0 | 0 | Very yellow, equal to control. |
| C | 0.2 | 0.33 | 4 | 2.5 | Light yellow. |
| D | 0.4 | 0.66 | 8 | 5.0 | Very Light yellow. |
| E | 0.8 | 1.3 | 16 | 10.0 | Nearly colorless. |
| F | 1.2 | 2.0 | 5 | 3.1 | Do. |

BOP=Based on polymer.
*Percent acid on water free basis.

*Example II*

A sample dope comprising 224 ml. of dimethylacetamide solvent, 1.2 gm. of powdered zinc, 2.0 ml. of 75 percent $H_3PO_4$, 1.0 ml. of 38 percent HCl, and 60 gms. of a copolymer of 93 percent AN and 7 percent VA was prepared according to the procedure of Example I. After holding the sample at 95° C. for one hour, it developed a very pale yellow color, whereas the control without the metal and acid stabilizers developed a very dark yellow color.

*Example III*

A number of dope samples were made by adding various amounts of powdered zinc or aluminum metal and hydrochloric or phosphoric acids to 1680 ml. of dimethylacetamide solvent, chilling the mixture to 5° C., then adding 480 gms. of a copolymer comprised of 93 percent AN and 7 percent VA while agitating vigorously, and heating the mixture to 85° C. to dissolve the polymer and form a viscous spinning solution. Each dope sample was extruded through a spinning jet and coagulated in an aqueous bath containing 55 percent dimethylacetamide solvent, washed and stretched 5.0 times in boiling water, and dried. The whiteness of the fiber product was determined by measurement on the General Electric Spectrophotometer. The type and amount of the stabilizing metal and acid evaluated in each sample, as well as the fiber whiteness values, are shown in Table II.

TABLE II

| Sample | Powdered Metal | | | Acid | | | Fiber Whiteness |
|---|---|---|---|---|---|---|---|
| | Type | Grams | Percent BOP | Type | Ml.* | Percent BOP | |
| A | Zn | 8.2 | 1.7 | HCl | 3.5 | 0.73 | 65 |
| B | Zn | 9.6 | 2.0 | $H_3PO_4$ | 12.0 | 2.5 | 64 |
| C | Al | 8.2 | 1.7 | HCl | 6.0 | 1.25 | 69 |
| D | Al | 9.6 | 2.0 | $H_3PO_4$ | 12.0 | 2.5 | 74 |
| E | | | | Control | | | 52 |

BOP=Based on polymer.
*Ml. acid calculated water free.

It will be understood to those skilled in the art that many apparently different embodiments of this invention can be made without departing from the spirit and scope thereof. Accordingly, it is to be understood that this invention is not to be limited to the specific embodiments thereof except as defined in the appended claims.

We claim:
1. A process for reducing the discoloration in a fiber forming acrylonitrile-based, polymeric dope being caused by the addition of heat to the same comprising charging a solvent for acrylonitrile-based polymers with an acid selected from the group consisting of hydrochloric acid and phosphoric acid; wherein, when hydrochloric acid is used it is present in amounts ranging from about 0.5% to about 10%, and when the phosphoric acid is used it is present in amounts ranging from about 1.0% to about 3.0%, and a metal being compatible with said solvent and being selected from the group consisting of zinc and aluminum; wherein, when zinc is used it is present in amounts ranging from about 0.3% to about 2.0%, and when aluminum is used it is present in amounts ranging from about 1.7% to about 2.0%, said acid and said metal reacting in said solvent medium to give off hydrogen gas and adding to said solvent an acrylonitrile-based polymer, said solvent dissolving said polymer upon agitation and the addition of heat, the percents based on weight of the polymer.

2. The process of claim 1 wherein the solvent is dimethylacetamide.

3. The process of claim 1 wherein the solvent is dimethylformamide.

4. A process for reducing the discoloration of a fiber forming, viscous polymer solution, said polymer being comprised of approximately 93 percent acrylonitrile and 7 percent vinyl acetate, comprising charging dimethylacetamide, said dimethylacetamide being a solvent for acrylonitrile-based polymers, with from about 0.5% up to about 10 percent based on the weight of the polymer of hydrochloric acid and from about 0.3% up to about 2 percent based on the weight of the polymer of zinc, said zinc and said hydrochloric acid reacting in said dimethylacetamide medium to give off hydrogen gas, adding to said dimethylacetamide said acrylic polymer, said solvent fully dissolving said polymer upon agitation and the addition of heat and filtering said dope to remove the portions of zinc chloride, said zinc chloride being a reaction product of zinc and hydrochloric acid.

References Cited

UNITED STATES PATENTS

| | | | |
|---|---|---|---|
| 2,661,343 | 12/1953 | Slocombe et al. | 260—45.7 |
| 2,695,278 | 11/1954 | Justice. | |
| 2,878,224 | 3/1959 | Jenkins et al. | |
| 2,946,760 | 7/1960 | De Witt et al. | |
| 3,088,932 | 5/1963 | Tarkington et al. | 260—45.75 |

MORRIS LIEBMAN, *Primary Examiner.*

B. A. AMERNICK, *Assistant Examiner.*